United States Patent
Shetty et al.

(10) Patent No.: US 11,809,445 B2
(45) Date of Patent: Nov. 7, 2023

(54) CROSS LOB BLENDING HANDLING ALONG WITH PERMISSIONS

(71) Applicant: SAP SE, Walldorf (DE)

(72) Inventors: Arpitha A Shetty, Dakshina Kannada (IN); Veekshitha, Dakshina Kannada (IN); Srinivas Vinnakota, Bangalore (IN); Amrita Prabhakaran, Bangalore (IN); Vijaya Pramilamma Bovilla, Badvel (IN); Priyanka Kommanapalli, Bangalore (IN)

(73) Assignee: SAP SE, Walldorf (DE)

( * ) Notice: Subject to any disclaimer, the term of this patent is extended or adjusted under 35 U.S.C. 154(b) by 121 days.

(21) Appl. No.: 17/463,117

(22) Filed: Aug. 31, 2021

(65) Prior Publication Data

US 2023/0064676 A1    Mar. 2, 2023

(51) Int. Cl.
*G06F 16/26* (2019.01)
*G06F 16/2458* (2019.01)
*G06F 16/25* (2019.01)
*G06F 16/242* (2019.01)
*G06F 21/62* (2013.01)

(52) U.S. Cl.
CPC .......... *G06F 16/26* (2019.01); *G06F 16/2445* (2019.01); *G06F 16/2471* (2019.01); *G06F 16/25* (2019.01); *G06F 21/6227* (2013.01); *G06F 2221/2141* (2013.01)

(58) Field of Classification Search
CPC .. G06F 16/26; G06F 16/2471; G06F 16/2445; G06F 16/25; G06F 21/6227; G06F 2221/2141
USPC ........................................................ 707/736
See application file for complete search history.

(56) References Cited

U.S. PATENT DOCUMENTS

| | | | |
|---|---|---|---|
| 10,795,908 B1 * | 10/2020 | Talbot | G06F 16/9024 |
| 11,294,928 B1 * | 4/2022 | Owens | G06F 16/26 |
| 11,475,052 B1 * | 10/2022 | Nielsen | G06F 16/2246 |
| 11,494,381 B1 * | 11/2022 | Champlin | G06F 16/248 |
| 2014/0053091 A1 * | 2/2014 | Hou | G06F 3/04886 715/810 |
| 2017/0185655 A1 * | 6/2017 | Jahankhani | G06F 16/951 |
| 2017/0206684 A1 * | 7/2017 | Duncker | G06F 40/143 |
| 2020/0334259 A1 * | 10/2020 | Taber | G06F 16/24565 |
| 2021/0133240 A1 * | 5/2021 | Talbot | G06F 16/26 |
| 2022/0398253 A1 * | 12/2022 | Shetty | G06F 16/26 |

* cited by examiner

*Primary Examiner* — Joshua Bullock
(74) *Attorney, Agent, or Firm* — Mintz Levin Cohn Ferris Glovsky and Popeo, P.C.

(57) ABSTRACT

A method for accessing data stored in a database may include receiving a query to generate, based on blended data, a visualization. The blended data may include a first set of data from a first data source and a second set of data from a second data source. The query may also include a payload. The method may also include accessing the first set of data by injecting, into the payload, the first permission, and transmitting, to the first data source, the payload including the first permission. The method may also include accessing the second set of data by injecting, into the payload, the second permission, and transmitting, to the second data source, the payload including the first permission, the first set of data, and the second permission. The method may also include causing, using the blended data, presentation of the visualization. Related systems and articles of manufacture are provided.

20 Claims, 10 Drawing Sheets

702 700A

```
  1  {
  2      "Analytics": {
  3  >      "Capabilities": [~
153        ],
154        "DataSource": {
155            "InstanceId": "5babbeb4-45e8-1dca-9b6b-d67d3ff706ea",
156            "ObjectName": "PREVIEW_aed2cf4f",
157            "PackageName": "B8B81100F80B48548ED19343F1C864C0",
158            "SchemaName": "B8B81100F80048548ED19343F1C864C0",
159            "Type": "View"
160        },
161        "Definition": {
162            "Dimensions": [
```

```
  2      "Analytics": {
  3  >      "Capabilities": [~
153        ],
154        "DataSource": {
155            "InstanceId": "5babbeb4-45e8-1dca-9b6b-d67d3ff706ea",
156            "ObjectName": "PREVIEW_aed2cf4f",
157            "PackageName": "B8B81100F80B48548ED19343F1C864C0",
158            "SchemaName": "B8B81100F80048548ED19343F1C864C0",
159            "SQL" : "CREATE VIEW PREVIEW_XXXXXX WITH......",
160            "Type": "View"
161        },
162        "Definition": {
163            "Dimensions": [
```

CROSS LOB BLENDING HANDLING ALONG WITH PERMISSIONS

TECHNICAL FIELD

The subject matter described herein relates generally to database processing and more specifically to blending data using an OEM integration service for presenting a blended data visualization.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for generating a blended data visualization that provides a visual representation of data stored in a database. In one aspect, there is provided a system. The system may include at least one data processor and at least one memory. The at least one memory may store instructions that result in operations when executed by the at least one data processor. The operations may include: receiving a query to generate, based on blended data, a visualization. The blended data may include a first set of data from a first data source and a second set of data from a second data source. The query may also include a payload configured to be executed. The operations may further include accessing the first set of data. The accessing may include injecting, into the payload, a first permission retrieved from a first endpoint and transmitting, to the first data source, the payload including the first permission. The operations may also include accessing the second set of data. The accessing may include injecting, into the payload, a second permission retrieved from a second endpoint and transmitting, to the second data source, the payload including the first permission, the first set of data, and the second permission. The operations may also include causing, at the user interface and using the blended data, presentation of the visualization.

In some aspects, the operations also include determining that the first permission is required to access the first set of data from the first data source and the second permission is required to access the second set of data from the second data source.

In some aspects, the first data source is associated with a first line of business. The first line of business may include the first endpoint. In some aspects, the second data source is associated with a second line of business. The second line of business may include the second endpoint. In some aspects, the first line of business is different from the second line of business.

In some aspects, the accessing the first set of data further includes calling the first endpoint of the first line of business to retrieve the first permission. The accessing the second set of data may include calling the second endpoint of the second line of business to retrieve the second permission.

In some aspects, the operations also include blending the first set of data and the second set of data.

In some aspects, based on a determination that the first data source is a primary data source and the second data source is a secondary data source, the first set of data is accessed from the first data source prior accessing the second set of data from the second data source.

In some aspects, the accessing the first set of data further includes injecting, into the payload, a first translation information retrieved from the first endpoint. The payload transmitted to the first data source may also include the first translation information. In some aspects, the accessing the second set of data further includes injecting, into the payload, a second translation information retrieved from the second endpoint. The payload transmitted to the second data source may include the second translation information.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7A depicts an example of a portion of a payload of a query in a JSON format file, in accordance with some example embodiments;

FIG. 7B depicts an example of a portion of a payload of a query in a JSON format file, with injected permissions, in accordance with some example embodiments;

FIG. 8 depicts an example of a portion of a payload of a query in a JSON format file, in accordance with some example embodiments;

FIG. 9 depicts an example of a portion of a payload of a query in a JSON format file, in accordance with some example embodiments;

FIG. 10 depicts an example of a portion of a payload of a query in a JSON format file, in accordance with some example embodiments;

When practical, similar reference numbers denote similar structures, features, or elements.

DETAILED DESCRIPTION

Figure 1:
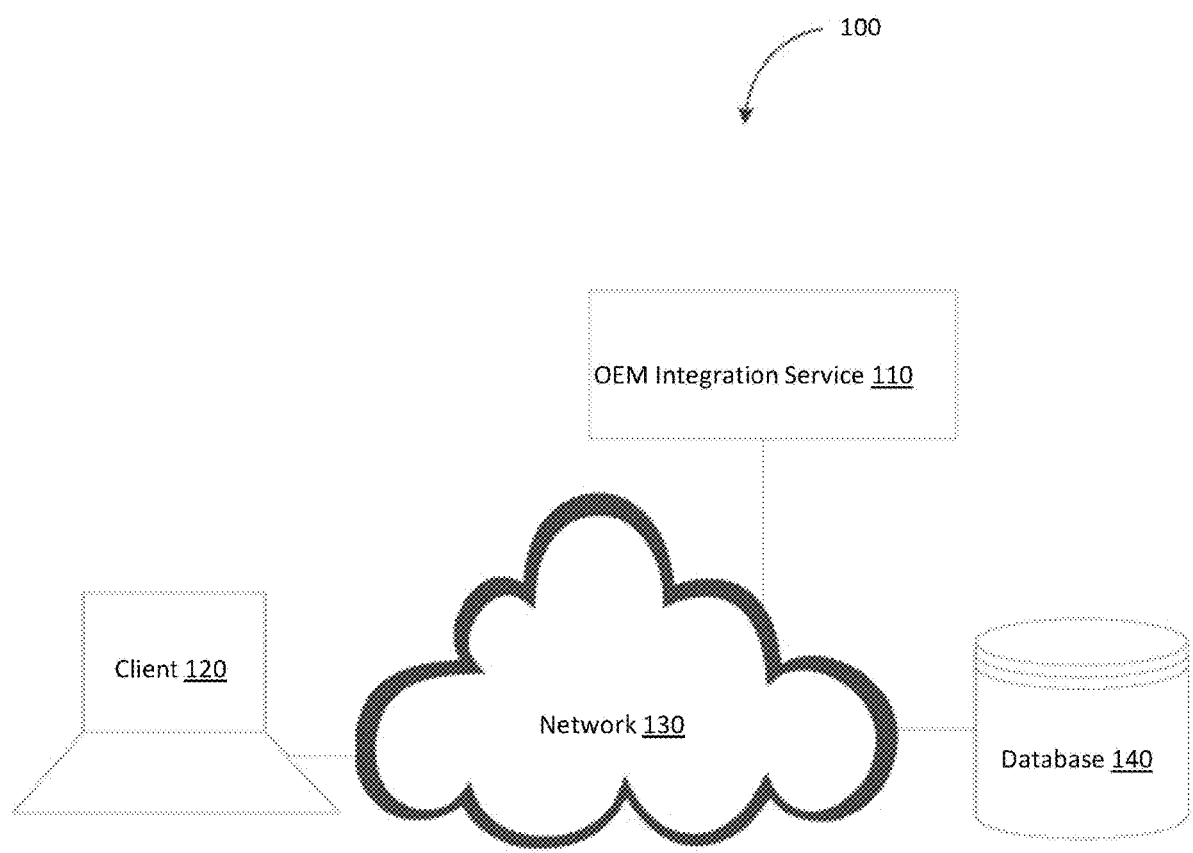
FIG. 1 depicts a system diagram illustrating an analytics system, in accordance with some example embodiments.

An OEM Integration Service ("OIS") may be configured to provide a variety of functionalities for accessing data stored in a database, such as data from one or more data sources. For example, the OIS may allow a user, via a graphical user interface ("GUI") or a dashboard of a client, to view a visualization generated based on data underlying data sources, each associated with a different line of business ("LoB"). For instance, a user may interact with at least a part of the GUI at the client in order to create, based at least on a portion of the data stored in the database from different data sources, a corresponding data presentation, such as the visualization.

The different LoBs may generally include one, two, three, four, five, or more LoBs. The LoBs may include separate business units. For example, an enterprise may include a plurality of different and/or separate LoBs. In other implementations, different enterprises represent an individual LoB. Each LoB may be isolated and/or separated from one another with respect to sharing data. Generally, the data underlying each of the different LoBs would be hosted in different locations, under different databases, using different semantics. In other words, each LoB may be a different entity, may be located in different countries, may represent a different product line, may be separated into a different sector, and/or the like. For example, the data, such as human resources data, financial data, employment data, sales data, product data, and/or the like, from one LoB may generally not be shared with another LoB and/or may generally not be accessible to another LoB. Moreover, each LoB may also have its own mechanism for handling permissions and may have different sets of permissions. Furthermore, each LoB may store the underlying data in a different manner, making it difficult to retrieve the data underlying each LoB and to combine the data underlying each LoB. Due to such differences between LoBs, it may be challenging to obtain data from each LoB, blend the data obtained from each LoB, and present a visualization generated based on the blended data.

As an example, a user may be interested in analyzing on-boarding data from a first data source (e.g., SAP SuccessFactors, and the like) along with user contract data from a second data source (e.g., Ariba, S4, SAP HANA, and the like) in a single dashboard. Generally, these data sources may be hosted in different locations, with different semantics, under different tenants with different permissions. In such instances, systems may individually retrieve the data from each of the data sources, but blending the data from each data source and presenting the blended data, while maintaining the data integrity, taking into account data permissions, data translations, and the like, and ensuring that the different data store configurations (e.g., authorization, endpoint calls, etc.) from each data source are respected, can be difficult and complex.

The analytics system consistent with embodiments of the current subject matter may access data from different data sources, blend the data from each data source, and cause generation of a visualization based on the blended data. For example, the analytics system may receive a query, such as via a client, to generate, based on blended data, a visualization. As noted above, the blended data may include a first set of data from a first data source and a second set of data from a second data source. Each of the first and second data sources may be associated with a different LoB. The query may also include a payload that is processed by an OIS to access the first set of data from the first data source and the second set of data from the second data source. To access the first set of data, the OIS may inject, into the payload, a first permission, and transmit the payload including the first permission to the first data source, where the payload is processed, and the first set of data is obtained. To access the second set of data, the OIS may then inject, into the payload, a second permission, and transmit the payload including the first permission, the first set of data, and the second permission, to the second data source, where the updated payload is processed, and the second set of data is obtained and blended with the first set of data. Using the blended data, the visualization may be generated and presented at the client. Additionally and/or alternatively, the OIS may inject, among other things, translation information, authorizations, and/or the like, into the payload for processing at each data source to obtain and/or blend the relevant data. Accordingly, the analytics system described herein may access and blend data from multiple data sources that have different structures, semantics, permissions, languages, etc., and present visualizations generated based on the blended data.

FIG. 1 depicts a system diagram illustrating an analytics system 100, in accordance with some example embodiments. Referring to FIG. 1, the analytics system 100 may include an OIS 110, a client 120, and a database 140. As shown in FIG. 1, the OIS 110, the client 120, and the database 140 may be communicatively coupled via a network 130. The network 130 may be any wired and/or wireless network including, for example, a wide area network (WAN), a local area network (LAN), a virtual local area network (VLAN), a public land mobile network (PLMN), the Internet, and/or the like. As described herein, the OIS 110 may process queries received from the client 120, such as requests to generate and display a visualization based on blended data from the database 140, by, for example, injecting the permissions, translations, authorizations, and the like, into the query to access the desired data.

The database 140 may be any type of database including, for example, a graph database, an in-memory database, a relational database, a non-relational (NoSQL) database, and/or the like. The database 140 may include one or more (e.g., one, two, three, four, five, or more) databases. Each of the databases may include one or more (e.g., one, two, three, four, five, or more) data sources. As described herein, each of the databases and/or the data sources of each database may be associated with a LoB.

In some example embodiments, the client 120 may be a mobile device including, for example, a smartphone, a tablet computer, a wearable apparatus, and/or the like. However, it should be appreciated that the client 120 may be any processor-based device including, for example, a laptop computer, a workstation, and/or the like. In some implementations, the client 120 includes an application, such as a mobile application, which may be a type of application software configured to run on a mobile device or any processor-based device. Moreover, the application of the client may be a web application configured to provide access, at the client 120, to the OIS 110. In some embodiments, the client 120 includes a graphical user interface. The user may interact with the graphical user interface. Additionally or alternatively, the generated visualization may be presented via the graphical user interface.

The client 120 may interact with the OIS 110 in order to access data and/or blend data stored in the database 140. For example, a user at the client 120 may send, such as via the application at the client 120, a request to generate and/or present a visualization, based on blended data from at least a portion of the data stored at the database 140, such as from at least two data sources. As used herein, a "visualization" may include data presentations such as, for example, tables, charts, graphs, diagrams, plots, and/or the like. The visualization may display reports, advanced analytics, and/or the like. It should be appreciated that the data retrieved from the data sources may be web content encoded in JavaScript Object Notation (JSON), Hypertext Markup Language (HTML), and/or Extensible Markup Language (XML). Alternatively and/or additionally, the definition of the visualization may represent the visualization based on the blended data, using JavaScript Object Notation (JSON), Hypertext Markup Language (HTML), Extensible Markup Language (XML), and/or the like. The definition of the visualization may capture the blended data used to create the data presentations included in the visualization as well as any permissions, translation information, authorizations, and/or the like that are injected to allow access to the data of the blended data.

A web browser associated with the client 120 may present, based at least on the blended data, the visualization. This web browser may be an "in-app web browser," which may refer to a web browser that is invoked through a corresponding application instead of being a standalone web browser. As such, the web browser associated with the client 120 may be used to embed web content such as, for example, the blended data retrieved from the database 140, directly within the application of the client 120, without requiring the use of a separate and/or standalone web browser.

In some example embodiments, at least a portion of the blended data retrieved from the database 140 and/or at least a portion of the injected permissions, translation information, authorizations, and/or the like, may be cached prior to being used to generate and present the visualization. For example, raw data from the LoBs, such as the permissions, the translation information, the authorizations, and/or the like, may be held in a cache before being processed and used to access the data stored in the data sources. The stored data may be used later by the OIS to access data from the corresponding data source.

Figure 2:
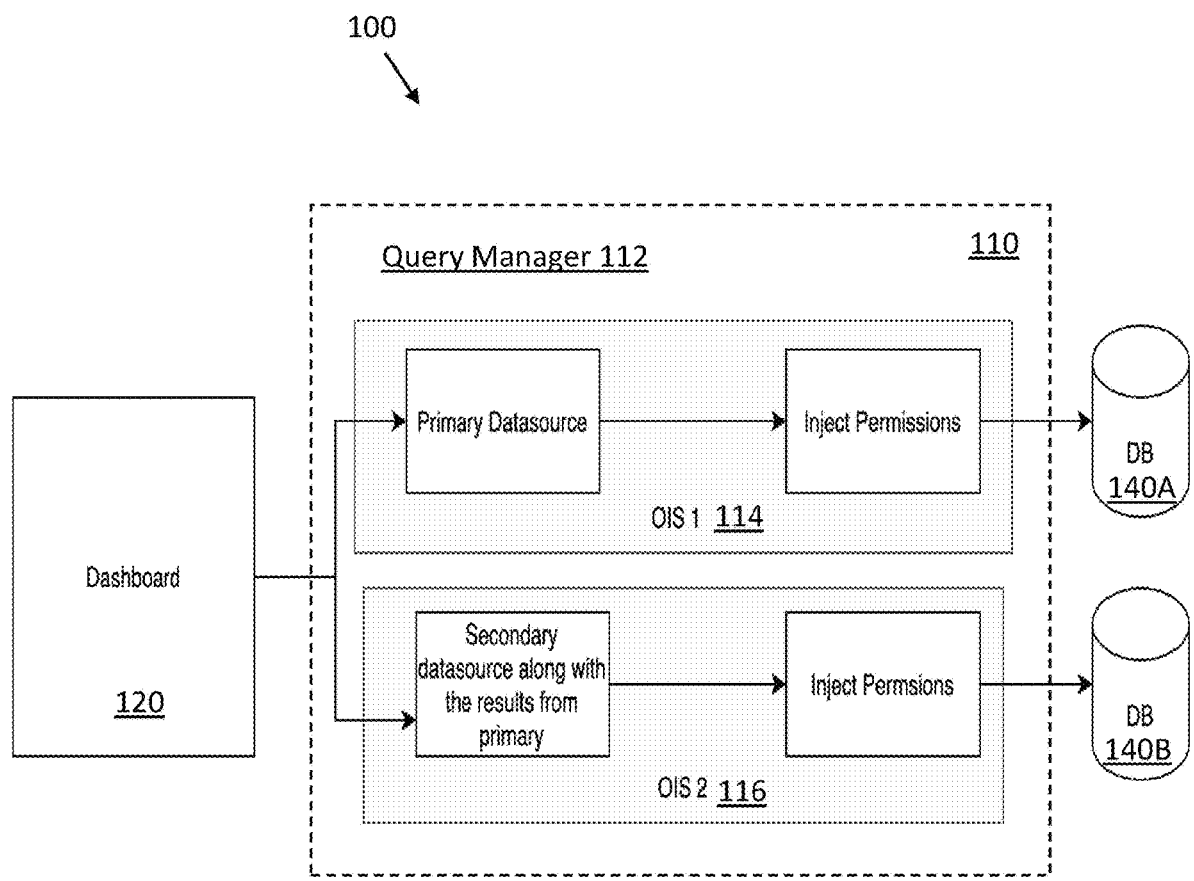
FIG. 2 depicts another system diagram of an analytics system, in accordance with some example embodiments.

To further illustrate, FIG. 2 depicts a block diagram illustrating another example of the analytics system 100, in accordance with some example embodiments. As shown in FIG. 2, the analytics system 100 may include a dashboard or user interface at the client 120. The dashboard may be used to display a visualization based on blended data from more than one (e.g., two, three, four, five, etc.) data sources. For example, the client 120 may display a visualization for "Spend Analytics" based on blended data from two data sources (e.g., an expense management data source or system, a vendor management data source or system, a report processing data source or system, a reimbursement processing data source or system and/or the like), which are independent and hosted on different tenants.

Referring to FIG. 2, the analytics system 100 may include one or more databases 140, such as a first database 140A and a second database 140B. Each of the first database 140A and the second database 140B may include a data source. In some implementations, the first database 140A and the second database 140B are separate databases. In some implementations, the first database 140A and the second database 140B form a part of the same database, but represent different data sources. In some embodiments, each of the databases may be associated with different lines of business. For example, the first database 140A may be associated with a first LoB and the second database 140B may be associated with a second LoB.

Again referring to FIG. 2, the analytics engine may include the OIS 110. The OIS 110 may be a middle layer module that sits between and is communicatively coupled to the client 120 and each of the databases 140A, 140B. The OIS 110 may inject the desired permissions, translations, authorizations, and the like, and the endpoints for certain OIS connections. The OIS 110 may include a first OIS 114, a second OIS 116, and so on. The OIS 110 may include a query manager 112 that processes queries received from the client 120, such as requests to generate and display a visualization based on blended data from the first database 140A and the second database 140B. The query manager 112 may include the first OIS 114, the second OIS 116, and/or the like. In some implementations, the first OIS 114 defines a first query manager, the second OIS 116 defines a second query manager, and/or the like.

For example, the query manager 112 of the OIS 110 may receive a query from the client 120. The query may include a payload, and a request to generate, based on blended data, a visualization. The blended data may include a first set of data from a first data source, such as the first database 140A and a second set of data from a second data source, such as the second database 140B. As noted above, the first and second data sources may be associated with different lines of business. Since the data sources may be associated with different lines of business, and each data source may require different sets of permissions, the OIS 110 may retrieve the required permissions from the respective endpoints at each LoB, and inject the permissions information into the payload of the query. For example, to access the data from the first data source at the first database 140A, the first OIS 114 may retrieve, from the endpoint at a first LoB, the appropriate permissions information. The first OIS 114 may inject the retrieved permissions information into the payload of the query, and transmit the payload to the first database 140A for processing. At the first database 140A, the payload may be processed by a database module at the first database 140A, to apply the permissions information and to aggregate the first set of data from the first data source. The aggregated data may be encrypted at the database 140A. the aggregated data may be transmitted back to the client 120 and/or to the second OIS 116.

To access the data from the second data source at the second database 140B, the second OIS 116 may retrieve, from the endpoint at a second LoB, the appropriate permissions information. The second OIS 116 may inject the retrieved permissions information into the payload of the query, and transmit the payload, including the data (e.g., the encrypted aggregated data) from the first database 140A, and the retrieved permissions information from the second LoB, to the second database 140B. At the second database 140B, the payload may be processed by a database module at the second database 140B, to apply the permissions information and to aggregate the second set of data from the second data source. The database module at the second database 140B may blend the aggregated data from the first data source and the aggregated data from the second data source. The database module may then transmit the blended data to the client 120 to be displayed as part of a visualization on the dashboard. While this example includes two data sources, data may be retrieved from any number of data sources, such as two, three, four, five, six, seven, eight, nine, ten, or more data sources. In examples in which data is retrieved from more than two data sources, the OIS 110 (e.g., the first OIS 114, the second OIS 116, a third OIS, a fourth OIS, and so on) may inject the corresponding permissions information into the payload to access the data from each of the respective data sources.

Figure 3:
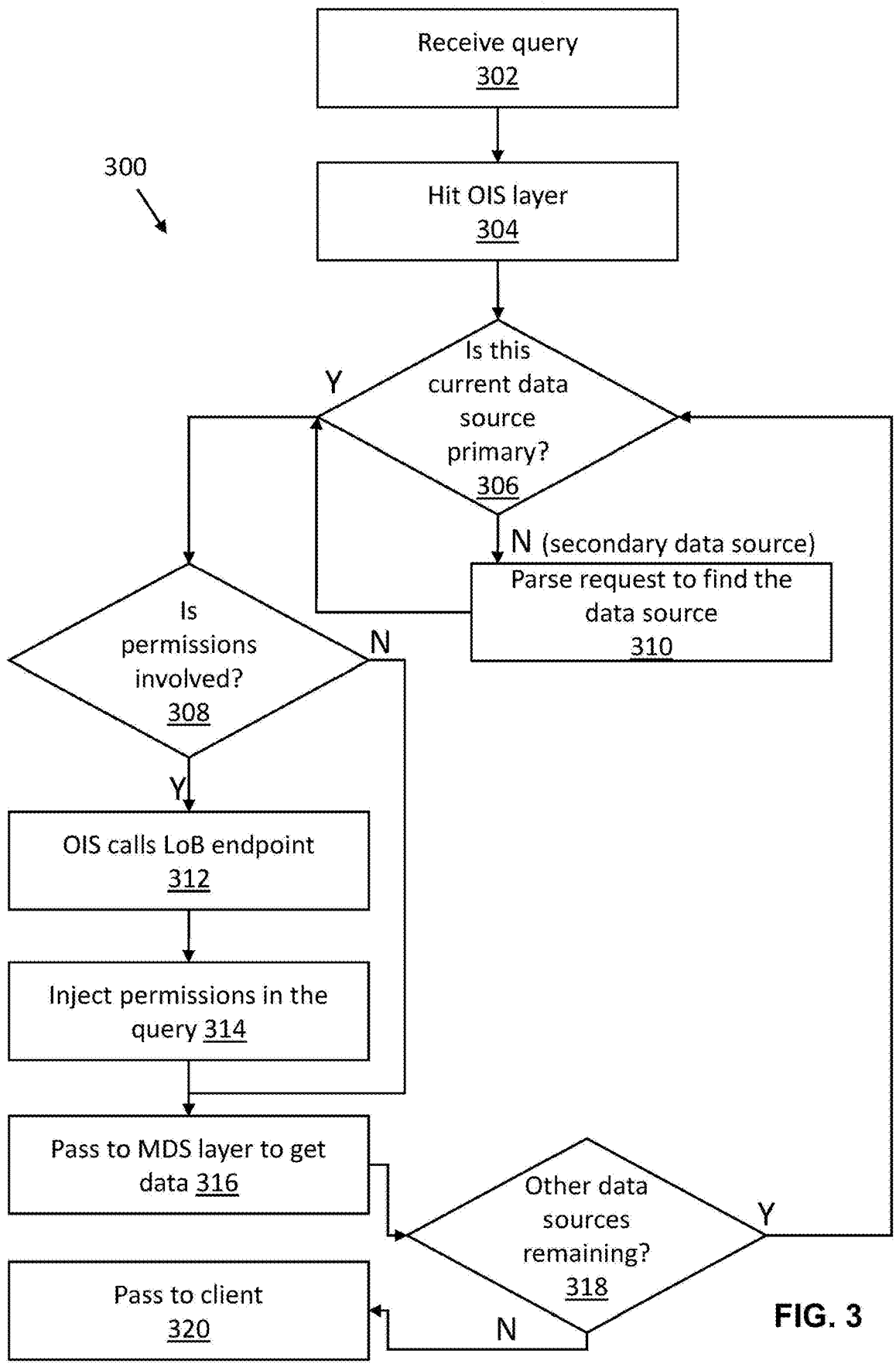
FIG. 3 depicts a workflow diagram illustrating a process for retrieving blended data using an OEM integration service, in accordance with some example embodiments.

FIG. 3 depicts a workflow diagram 300 illustrating a process for retrieving blended data using the OIS 110, in accordance with some example embodiments. The steps of the workflow diagram 300 may be used in combination with and/or instead of one or more steps of the workflow diagram 1100, as described in more detail below.

At 302, the analytics system 100 may receive a query, such as at the client 120. The query may include a request to generate, based on blended data, a visualization, as described herein. The query may also include a payload configured to be processed to retrieve the blended data. The blended data may include data, such as a first set of data from a first data source associated with a first LoB, and a second set of data from a second data source associated with a second LoB. The first LoB may be the same as the second LoB. Alternatively, the first LoB may be different from the second LoB.

In some embodiments, the first and second data sources are stored in a different database. For example, the first data source may be stored in a first database and the second data source may be stored in a second database. As an example, the first data source may represent a first model of the first database and the second data source may represent a second model of the second database, where the first model is different from the second model.

In some embodiments the first and second data sources may be stored in the same database. For example, the first data source may be stored in a first portion of a database, and the second data source may be stored in a second portion of the database. As an example, the first data source may represent a first model of the database and the second data source may represent a second model of the same database, where the first model is different from the second model.

In some embodiments, the first data source and the second data source are nested. As described in more detail below, within the nested data source, the OIS 110 may access data from the first data source before accessing data from the second data source.

To access the requested blended data from each of the data sources, the client 120 may transmit the query including the payload to the OIS 110. For example, at 304, the analytics system 100 may hit the OIS layer 110. The OIS 110 may process and/or update the payload of the query, such as via the query manager 112 to allow for the data in each of the data sources to be accessed, while maintaining the data integrity and ensuring that the different data store configurations (e.g., authorization, endpoint calls, etc.) from each data source are respected.

The OIS 110, such as via the query manager 112, may iterate through the data sources, such as the first data source and the second data source. For example, at 306, the OIS 110 may determine whether the current data source, such as the first data source, the second data source, and the like, is a primary data source or a secondary data source. Based on a determination that the current data source is the primary data source, the OIS 110 processes and/or updates the payload of the query to enable a set of data to be accessed from the data source. For example, the OIS 110 may determine that the first data source is the primary data source. This enables the first set of data to be accessed from the first data source and processed before the second set of data is accessed from the second data source and is processed. Thus, if the OIS 110 determines that the current data source is the primary data source, the OIS 110 may prepare the payload to access the requested set of data from the current data source.

If the OIS 110 determines that the current data source being accessed is not the primary data source, at 310, the OIS 110 may parse the request to determine the data source. For example, the OIS 110 may determine that the current data source is a secondary data source, a third data source, and/or the like. In other words, the OIS 110 may determine that the current data source is a data source that is being accessed after a previous data source has already been accessed. The OIS 110 may then prepare the payload to access the requested set of data from the current data source. In this example, the OIS 110 would prepare the payload to access the requested set of data from the second data source, the third data source, and/or the like.

As noted above, the data source may be a nested data source in which the first data source is nested with the second data source. In such embodiments, the OIS 110 determines that the first data source is the primary data source and the second data source is the secondary data source. Again, the OIS 110 would prepare the payload to access the first set of data from the first data source before the second set of data from the second data source within the nested data source. The OIS 110 may then prepare the payload to access a third set of data from another data source, such as a third data source, which may be the same or different from the first data source and/or the second data source.

In some embodiments, the data sources are included in the payload of the query transmitted from the client 120 and received by the OIS 110. For example, the first data source, the second data source, and so on, may be included in the initial payload of the query. Thus, the query may indicate whether the first data source is the primary data source, the second data source is the secondary data source, and so on.

Figure 4:
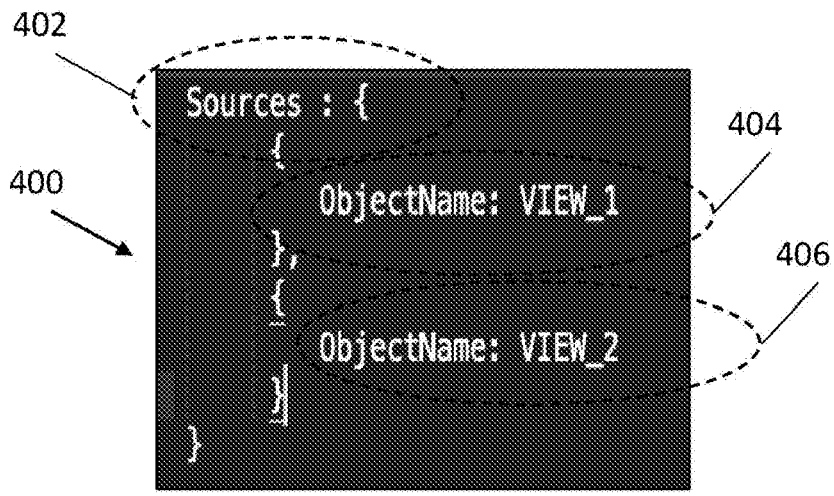
FIG. 4 depicts an example of a portion of a JavaScript object notation (JSON) format file defining data sources, in accordance with some example embodiments.
Figure 5:
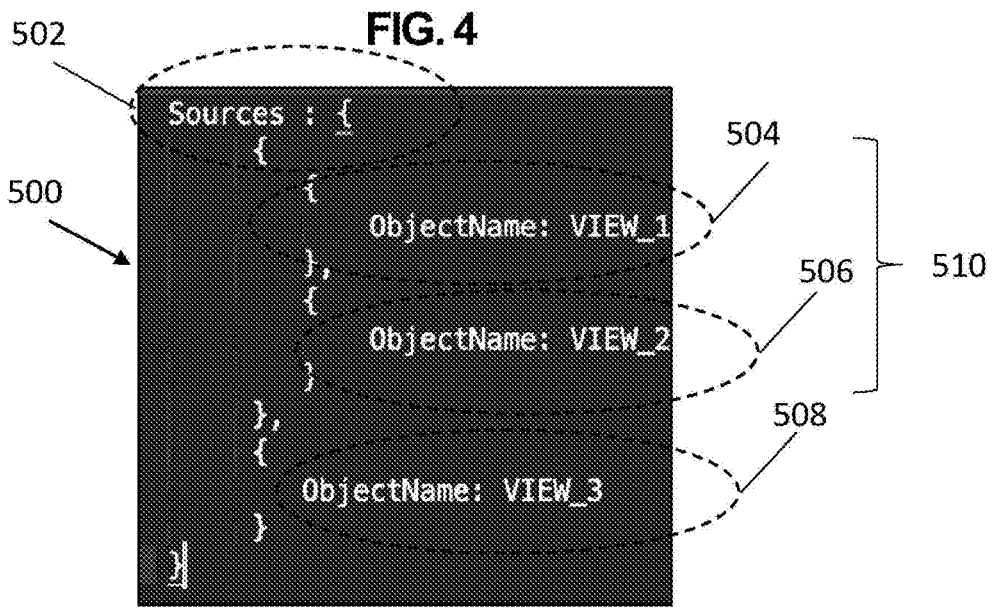
FIG. 5 depicts an example of a portion of a JSON format file defining data sources, in accordance with some example embodiments.
Figure 6:
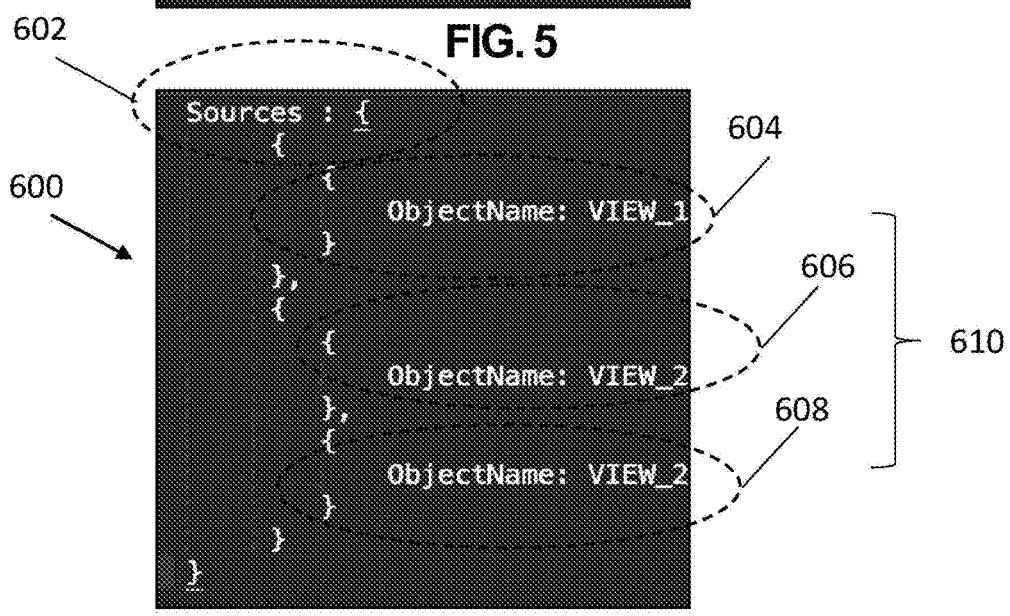
FIG. 6 depicts an example of a portion of a JSON format file defining data sources, in accordance with some example embodiments.

For example, the payload of the query may contain, in a data interchange format, such as JSON format, one or more objects that are defined, at the client 120, as a particular data source. FIGS. 4-6 illustrate portions of a JSON format file including objects defined as data sources, as part of the payload of the query, in accordance with some example embodiments. FIG. 4 illustrates a payload 400 of the query including a "sources" expression 402 defining two objects, such as a primary object 404 (e.g., a primary data source) and a secondary object 406 (e.g., a secondary data source), consistent with embodiments of the current subject matter. In this example, the OIS 110 would determine that the first data source is the primary data source, defined as the primary object 404, and the second data source is the secondary data source, defined as the secondary object 406. The OIS 110 may make that determination, since the primary object 404 is listed before the secondary object 406 within the "sources" expression 402. Thus, in this example, the OIS 110 may access the first set of data stored within the first data source prior to accessing the second set of data stored within the second data source.

As another example, FIG. 5 illustrates a payload 500 of the query including a "sources" expression 502 defining two objects, such as a primary object 510 and a secondary object 508, consistent with embodiments of the current subject matter. In this example, the OIS 110 would determine that the first data source is the primary data source, defined as the primary object 510, and the second data source is the secondary data source, defined as the secondary object 508. In this example, the OIS 110 accesses the data from the primary object 510 before the data from the secondary object 508, since the primary object 510 is listed before the secondary object 508 in the payload 500 under the "sources" expression 502. The OIS 110 may determine that the primary object 510 is a nested object that includes two or more (e.g., two, three, four, five, or more) nested data sources, such as a first nested data source and a second nested data source, each defined as an object within the nested object. Since the primary object 510 is a nested object, the OIS 110 determines that the first nested data source is the primary nested data source, defined as a primary nested object 504 within the primary object 510, and the second nested data source is the secondary nested data source, defined as the secondary nested object 506 within the primary object 510. The OIS 110 may make that determination, since the primary nested object 504 is listed before the secondary nested object 506 within the primary object 510. Thus, in this example, the OIS 110 may access a first set of data stored within the primary nested data source of the first data source prior to accessing a second set of data stored within the second nested data source of the first data source. Additionally and/or alternatively, the OIS 110 may access a third set of data stored within the second data source. It should be appreciated that the first nested data source may also represent the first data source as described herein, and the second nested data source may also represent the second data source as described herein.

As another example, FIG. 6 illustrates a payload 600 of the query including a "sources" expression 602 defining two objects, such as a primary object 604 and a secondary object 610, consistent with embodiments of the current subject matter. In this example, the OIS 110 would determine that the first data source is the primary data source, defined as the primary object 604, and the second data source is the secondary data source, defined as the secondary object 610. In this example, the OIS 110 accesses the data from the primary object 604 before the data from the secondary object 610, since the primary object 604 is listed before the secondary object 610 in the payload 600 under the "sources" expression 602. The OIS 110 may determine that the secondary object 610 is a nested object that includes two or more (e.g., two, three, four, five, or more) nested data sources, such as a first nested data source and a second nested data source, each defined as an object within the nested object. Since the secondary object 610 is a nested object, the OIS 110 determines that the first nested data source is the primary nested data source, defined as a primary nested object 606 within the secondary object 610, and the second nested data source is the secondary nested data source, defined as the secondary nested object 608 within the secondary object 610. The OIS 110 may make that determination, since the primary nested object 606 is listed before the secondary nested object 608 within the secondary object 610. Thus, in this example, the OIS 110 may access a first set of data stored within the first data source. The OIS 110 may then access a second set of data stored within the first nested data source of the second data source, and a third set of data stored within the second nested data source of the second data source. It should be appreciated that the first nested data source may also represent the first data source as described herein, and the second nested data source may also represent the second data source as described herein.

Figures 8, 9:
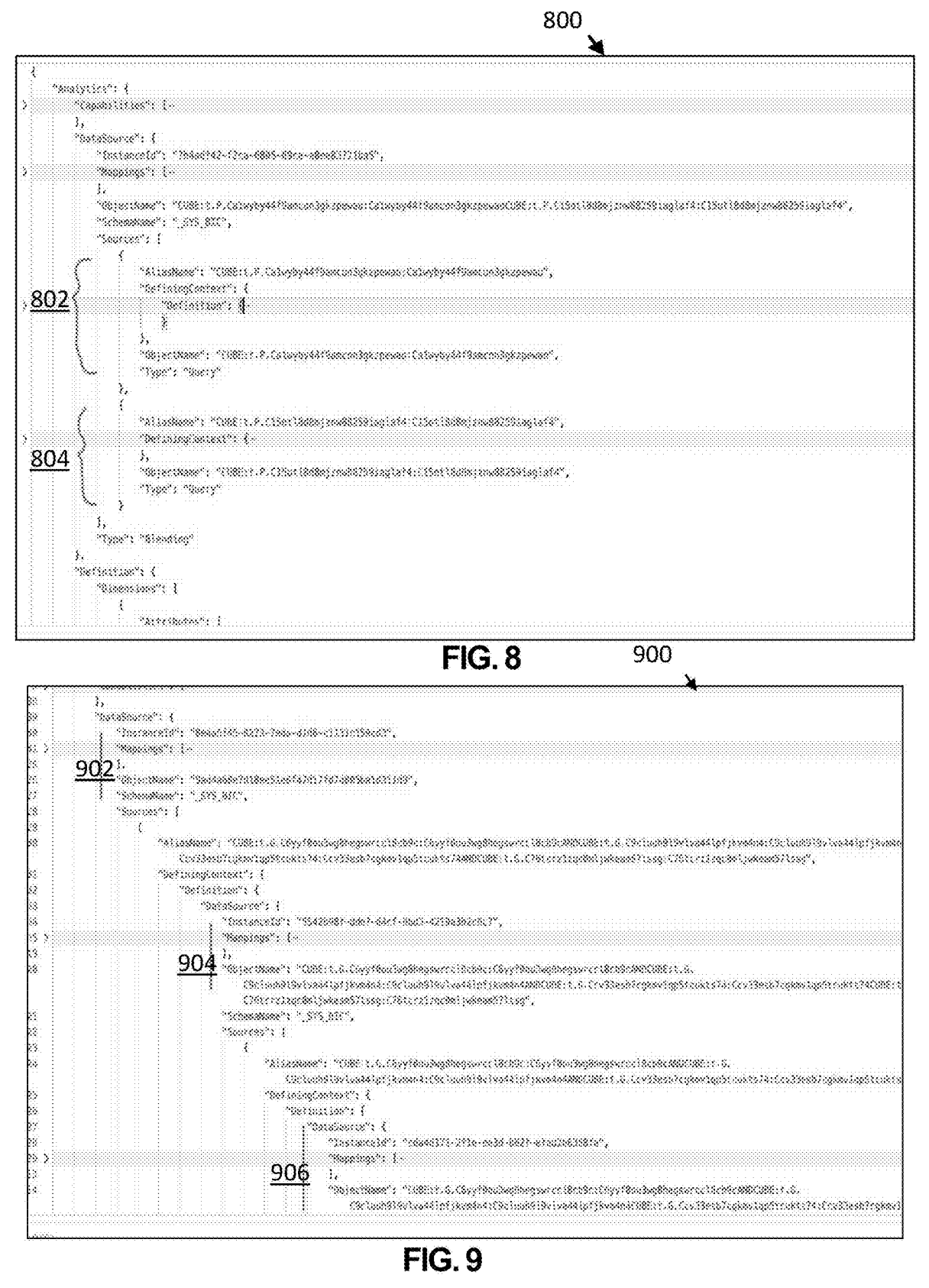

FIGS. 8 and 9 illustrate additional examples of a portion of a payload of a query in a JSON format file, in accordance with some example embodiments. For example, FIG. 8 illustrates a portion of a payload 800 of the query received by the OIS 110 from the client 120. As shown in FIG. 8, the payload 800 may include a request to access data from a first data source 802 and a second data source 804. In this example, the first data source 802 corresponds to a first database model and the second data source 804 corresponds to a second database model. Each of the first database model and the second database model are stored in the same database.

FIG. 9 illustrates a portion of a payload 900 of the query received by the OIS 110 from the client 120. As shown in FIG. 9, the payload 900 may include a nested data source that includes a first nested data source 902, a second nested data source 904, and a third nested data source 906. Each of the nested data sources 902, 904, 906 may represent different nodes of a database. Additionally or alternatively, each of the nested data sources 902, 904, 906 may represent different database models that are stored on the same or different database.

Once the OIS 110 determines whether the current data source to be accessed is the primary data source or the secondary data source, the OIS 110 may determine whether permissions, authorizations, translations, and/or the like are required to access the data from the current data source. For example, referring back to FIG. 3, at 308, the OIS 110 may determine whether permissions are involved in the processing of the payload of the query. In other words, the OIS 110 may determine whether permissions are required to access the first set of data from the first data source and/or the second set of data from the second data source. If permissions are not involved in the processing of the payload of the query, the OIS 110 may transmit, at 316, the payload to the corresponding data source of the database, such as the database 140, for processing to access the corresponding set of data.

Based on the determination that permissions are involved, at 312, the OIS calls the LoB endpoint of the LoB associated with the corresponding data source to retrieve the corresponding permissions or permissions information. For example, the OIS 110 may retrieve, from a first LoB endpoint associated with the first data source, a first permission required to access the first set of data from the first data source. Additionally and/or alternatively, the OIS 110 may retrieve, from a second LoB endpoint associated with the second data source, a second permission required to access the second set of data from the second data source, and so on.

At 314, the OIS 110 may inject, into the payload of the query, the retrieved permissions or permissions information. For example, the OIS 110 may inject, into the payload of the query, the first permission retrieved from the first LoB endpoint. If the OIS 110 is preparing the payload of the query to access the second set of data from the second data source, the OIS 110 may inject, into the payload of the query, the second permission retrieved from the second LoB endpoint.

FIGS. 7A and 7B illustrate examples of a portion of a payload of a query in a JSON format file, in accordance with some example embodiments. For example, FIG. 7A illustrates a portion of a payload 700A of the query received by the OIS 110 from the client 120. As shown in the portion of the payload 700A, the expression "DataSource" 702 defines the data source from which the OIS 110 accesses the requested data, as well as the information required to access the data from the particular data source. FIG. 7B illustrates the portion of an updated payload 700B, representing an update of the payload 700B, after the OIS 110 has injected the relevant permissions or permissions information 704 into the payload. In some embodiments, the permissions or permissions information 704 includes a set of permissions data stored in one or more data tables. In some embodiments, the permissions or permissions information 704 includes a clause in a structured query language (SQL) view that is injected into the structural part of the semantic model, such as under the "DataSource" expression 702, of the payload of the query. The clause can then be processed at the corresponding data source (or database) to allow the requested data to be accessed.

Referring back to FIG. 3, at 316, once the appropriate permissions are injected into the payload of the query, the OIS 110 may transmit the payload to the current data source, such as the first data source, the second data source, and/or the like, stored at the database, such as the database 140. At the database, such as via a master data services ("MDS") layer, the payload may be processed to access the relevant set of data at the data source by, for example, applying the injected permissions.

Figure 10:
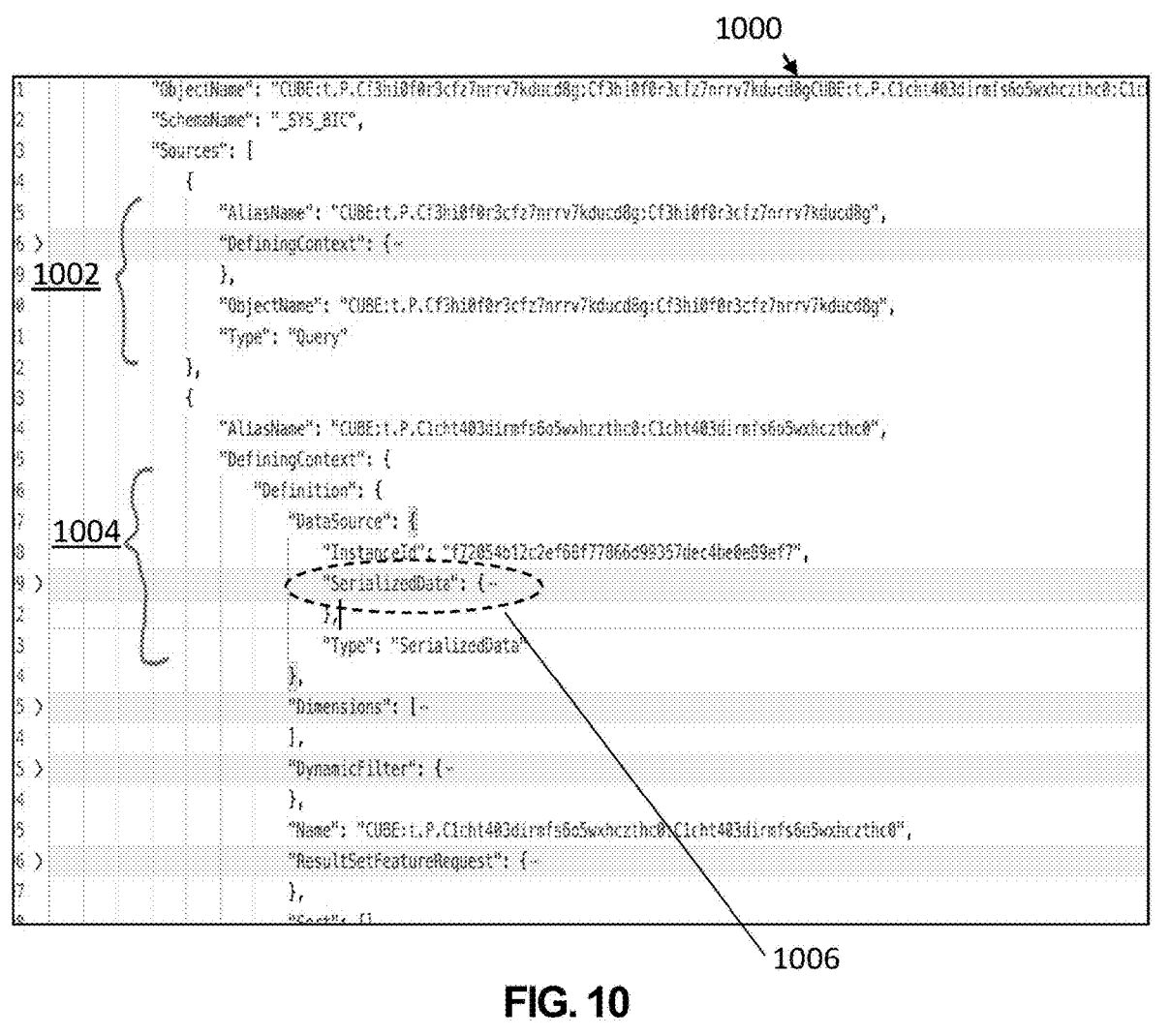

At 318, the analytics system 100, such as via the OIS 110, may determine whether additional data sources need to be accessed to retrieve and/or blend the requested data. If additional data sources are required to be accessed, the process returns to step 306. If no additional data source are required to be accessed, the MDS layer at the database may blend the data from each of the data sources, and at 320, the MDS layer may transmit the blended data to the client 320 to display the blended data as part of a visualization. c In some embodiments, the data requested for generating the visualization may be serialized data. For example, FIG. 10 illustrates a portion of a payload 1000 of the query received by the OIS 110 from the client 120. As shown in FIG. 10, the payload 1000 may include a request to access data from a first data source 1002 and a second data source 1004. In this example, the first data source 1002 corresponds to a first database model and the second data source 1004 corresponds to a second database model. Each of the first database model and the second database model are stored in the same database. However, in this example, the data from the second data source is serialized, as indicated by the expression "SerializedData" 1006. In this example, the serialized data includes the full serialized data from the second data source. In other words, permissions, translations, authorizations and/or the like does not need to be applied, and instead, the data may be accessed without injecting permissions, translations, authorizations, and/or the like into the payload, as the full set of data is already included.

Figure 11:
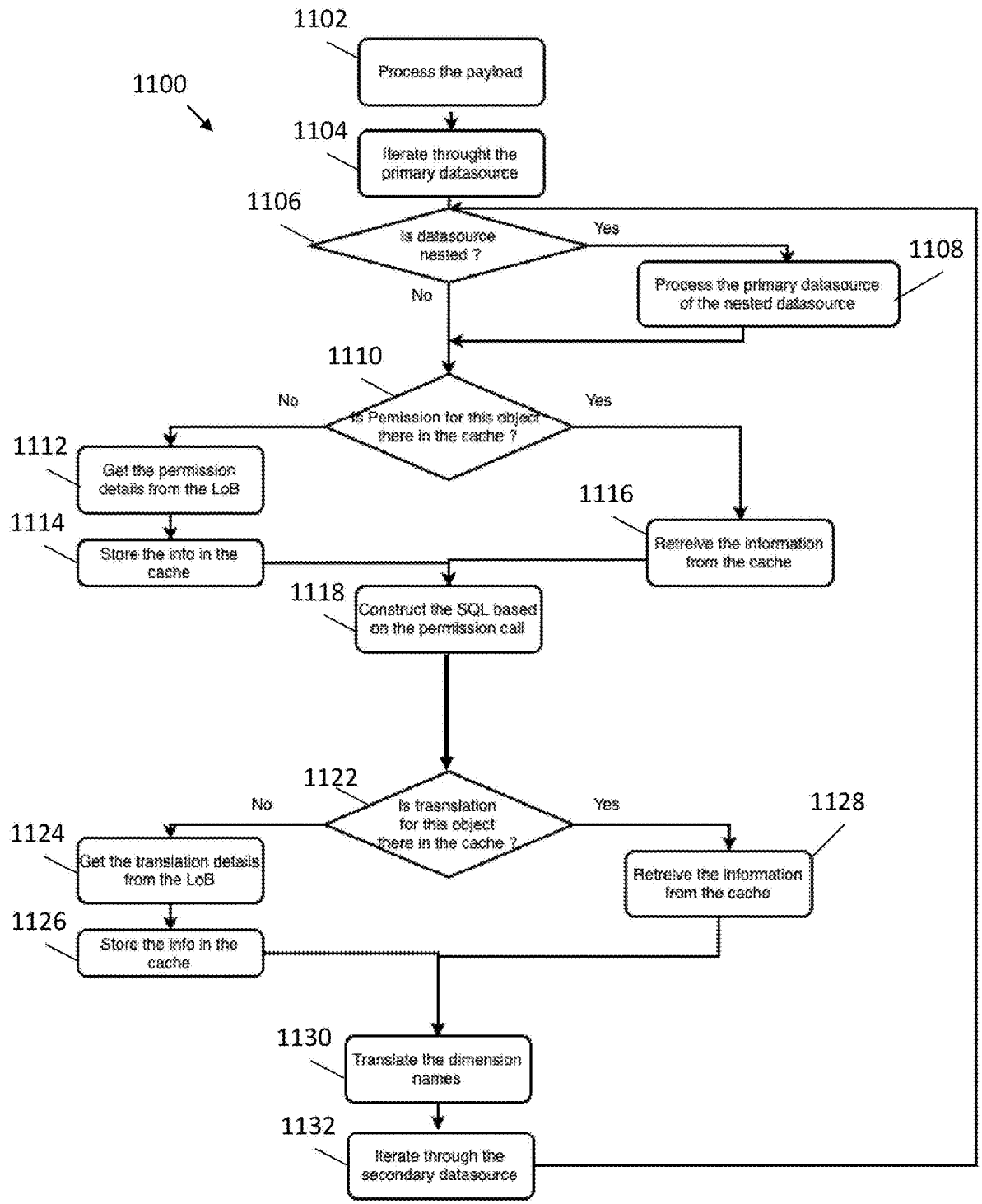
FIG. 11 depicts a workflow diagram illustrating a process for retrieving blended data using an OEM integration service, in accordance with some example embodiments.

FIG. 11 depicts a workflow diagram 1100 illustrating a process for retrieving blended data using the OIS 110, in accordance with some example embodiments. The steps of the workflow diagram 1100 may be in combination with and/or instead of one or more steps of the workflow diagram 300, as described above.

As described herein, the analytics system 100 may receive a query, such as at the client 120. The query may include a request to generate, based on blended data, a visualization, as described herein. The query may also include a payload configured to be processed to retrieve the blended data. The blended data may include data, such as a first set of data from a first data source associated with a first LoB, and a second set of data from a second data source associated with a second LoB. The first LoB may be the same as the second LoB. Alternatively, the first LoB may be different from the second LoB. At 1102, the analytics system 100 may process the payload of the query. For example, the query may be transmitted from the client 120 to the OIS 110 to be processed.

In some embodiments, the OIS 110 may prepare and/or update the payload of the query to access the requested data from the corresponding data sources. However, as described herein, one or more permissions, translations, and/or the like, may be needed to access the data of the data sources. The analytics system 100 described herein may efficiently and quickly incorporate the appropriate permissions, translations, and/or the like to access and blend the requested data for generating and displaying a visualization.

At 1104, the OIS 110 may iterate through the first or primary data source to access a first set of data from the first data source. For example, at 1106, the OIS 110 may determine whether the first data source is nested. If the first data source is nested, the OIS 110, at 1108, processes the primary nested data source of the first data source. After the primary nested data source of the first data source is processed, the OIS 110 may process the secondary nested data source of the first data source.

If the first data source is not nested, at 1110, the OIS 110 may determine whether permissions or permissions information (e.g., the first permission) for the primary object defining the first data source in the payload of the query is stored in cache of the analytics system 100. If the first permission is stored in cache, at 1116, the OIS 110 may retrieve the first permission from the cache. If the first permission is not stored in cache, at 1112, the OIS 110 may call the LoB endpoint from the first LoB associated with the first data source to obtain the first permission from the first LoB. At 1114, the OIS 110 may then store the first permission in cache for later use.

Once the first permission has been retrieved by the OIS 110, the OIS 110 may inject the first permission into the payload of the query. For example, at 1118, the OIS 110 may construct a clause in SQL based on the first permission call and inject the clause into the payload of the query. The payload, including the first permission, may be transmitted (e.g., by the OIS 110) to the database 140 for processing at the database to access the first set of data from the first data source. The payload including the first permission and the first set of data may then be transmitted to the OIS 110 and/or to the client 120.

In some embodiments, the requested data may need to be translated. For example, the requested data from each data source may be stored in a different language. To blend the data and generate the visualization for presentation at the client 120, the data from one or more data sources may be translated. Thus, in some embodiments, translation information may be needed to access and/or blend the requested data from one or more of the data sources.

For example, the OIS 110 may determine whether translations or translation information (e.g., a first translation information) for the primary object defining the first data source in the payload of the query is stored in cache of the analytics system 100. If the first translation information is stored in cache, at 1128, the OIS 110 may retrieve the first translation information from the cache. If the first translation information is not stored in cache, at 1124, the OIS 110 may call the LoB endpoint from the first LoB associated with the first data source to obtain the first translation information from the first LoB. At 1126, the OIS 110 may then store the first translation information in cache for later use.

Once the first translation information has been retrieved by the OIS 110, the OIS 110 may inject the first translation information into the payload of the query. For example, the OIS 110 may construct a clause in SQL based on the first translation information call and inject the clause into the payload of the query. The payload, including the first translation information, the first permission and/or the like, may be transmitted (e.g., by the OIS 110) to the database 140 for processing at the database to access the first set of data from the first data source. The payload including the first translation information, the first permission and/or the like, and the first set of data may then be transmitted to the OIS 110 and/or to the client 120.

At 1132, the OIS 110 may iterate through the second or secondary data source by returning to step 1106 and applying steps 1106 through 1130 to access the second set of data from the second data source. For example, once processed, the payload, including the second permission, the second translation information, and the first set of data accessed from the first data source may be transmitted to the second data source for processing at the database to access the second set of data and blend the first set of data and the second set of data. The analytics system 100 may generate a visualization based on the blended data for presentation at the client 120, such as via a dashboard or a user interface.

Figure 12:
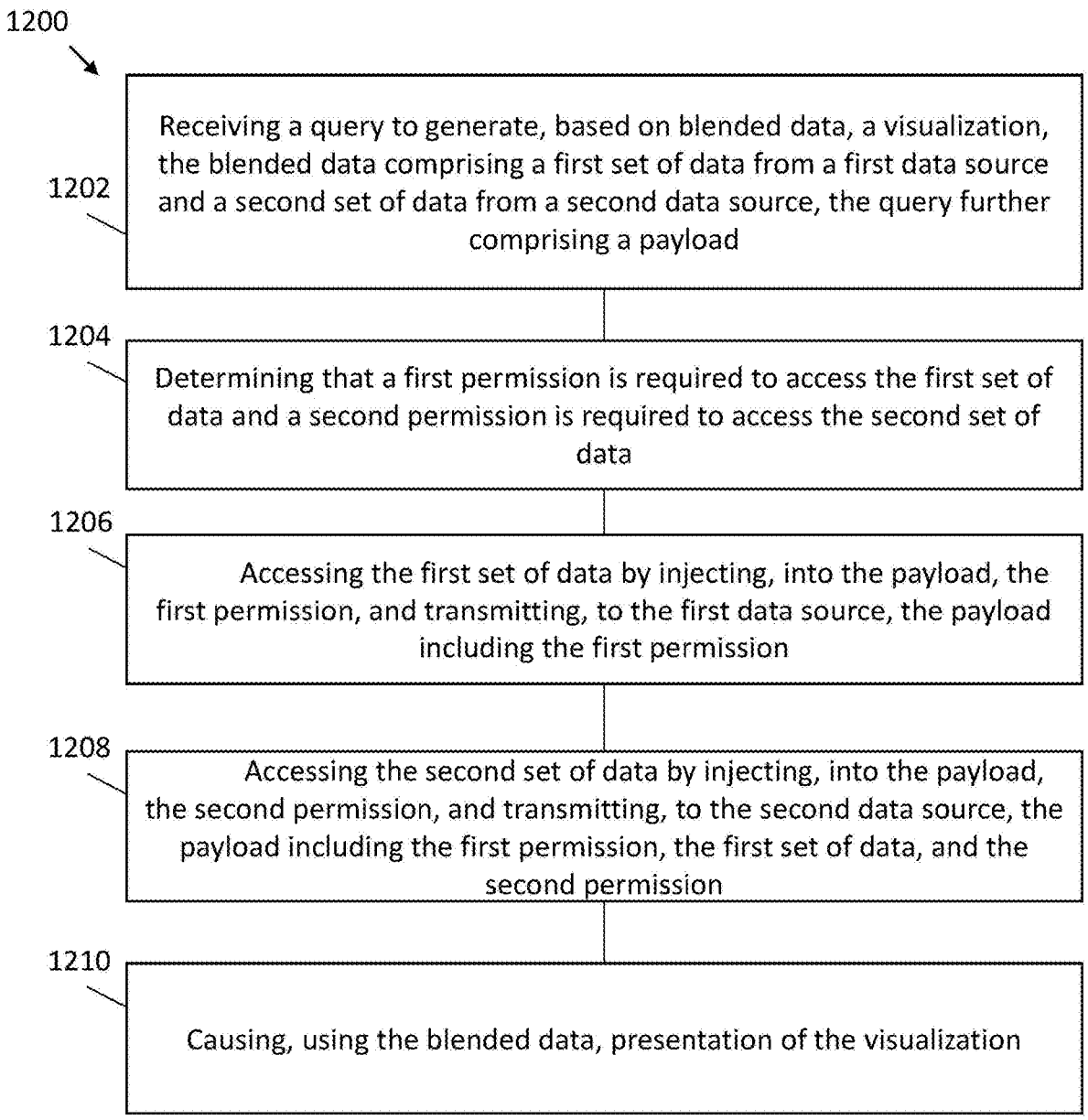
FIG. 12 depicts a flowchart illustrating a process for causing presentation of a visualization of blended data from a database, in accordance with some example embodiments.

FIG. 12 depicts a flowchart illustrating a process 1200 for causing presentation of a visualization of blended data from a database, in accordance with some example embodiments. Referring to FIGS. 1, 2, 3, 4, 5, 6, 7A, 7B, 8, 9, 10, 11, and 12, one or more aspects of the process 1200 may be performed by the analytics system 100, such as the client 120, OIS 110 and/or the MDS layer at the database 140. The analytics system 100 described herein may efficiently and quickly incorporate the appropriate permissions, translations, and/or the like to access and blend requested data, such as data from multiple data sources associated with different lines of business, for generating and displaying a visualization.

At 1202, the analytics system 100, such as via the client 120, may receive a query to generate, based on blended data, a visualization. In some embodiments, the client 120 may transmit the query to the OIS 110 for processing. Thus the OIS 110 may receive the query from the client 120. The query may include a payload configured to be processed to retrieve the blended data. The blended data may include data, such as a first set of data from a first data source associated with a first LoB, and a second set of data from a second data source associated with a second LoB. The first LoB may be the same as the second LoB. Alternatively, the first LoB may be different from the second LoB.

In some embodiments, the first and second data sources are stored in a different database. For example, the first data source may be stored in a first database and the second data source may be stored in a second database. As an example, the first data source may represent a first model of the first database and the second data source may represent a second model of the second database, where the first model is different from the second model.

In some embodiments the first and second data sources may be stored in the same database. For example, the first data source may be stored in a first portion of a database, and the second data source may be stored in a second portion of the database. As an example, the first data source may represent a first model of the database and the second data source may represent a second model of the same database, where the first model is different from the second model. In some embodiments, the first data source and the second data source are nested.

In some embodiments, the OIS 110 may iterate through the first data source and/or the second data source. For example, the OIS 110 may determine that the first data source is a primary data source. Additionally and/or alternatively, the OIS 110 may determine that the second data source is a secondary data source. Based on at least the determination that the first data source is the primary data source, the OIS 110 may access the first set of data from the first data source prior to accessing the second set of data from the second data source.

In some embodiments, the OIS 110 may determine that the first data source and the second data source are nested in a nested data source. The OIS 110 may determine that the first data source is a primary nested data source. Additionally and/or alternatively, the OIS 110 may determine that the second data source is a secondary nested data source. Based on at least the determination that the first data source is the primary nested data source, the OIS 110 may access the first set of data from the primary nested data source prior to accessing the second set of data from the secondary nested data source.

In some embodiments the OIS 110 may determine whether permissions (e.g., a first permission, a second permission, and/or the like), translation information (e.g., a first translation information, a second translation information, and/or the like), authorizations (e.g., a first authorization, a second authorization, and/or the like), and/or the like are required to access the first set of data from the first data source (or the primary nested data source) and/or the second set of data from the second data source (or the secondary nested data source).

At 1204, the OIS 110 may determine that the first permission is required to access the first set of data and/or the second permission is required to access the second set of data. In some embodiments, since the first data source is associated with a first LoB and the second data source is associated with a second LoB, the permissions required to access the data from each data source may be different. Thus, the OIS 110 may need to obtain the appropriate permissions from each LoB to access the data from each data source.

At 1206, the OIS 110 may access the first set of data. In particular, the OIS 110 may inject, into the payload of the query, a first permission retrieved from a first endpoint of the first LoB. For example, the OIS 110 may call the first endpoint of the first LoB to retrieve the first permission. The OIS 110 may inject the first permission to the structural part of the semantic model of the payload (e.g., such as by adding a clause in SQL). The OIS 110 may additionally and/or alternatively transmit, to the first data source, the payload including the first permission. In some embodiments, the payload is executed at the database where the first data source is stored. For example, an MDS layer at the database may execute the payload by applying the first permission to access the first set of data from the first data source.

At 1208, the OIS 110 may access the second set of data. In particular, the OIS 110 may inject, into the payload of the query, a second permission retrieved from a second endpoint of the second LoB. For example, the OIS 110 may call the second endpoint of the second LoB to retrieve the second permission. The OIS 110 may inject the second permission to the structural part of the semantic model of the payload (e.g., such as by adding a clause in SQL). The OIS 110 may additionally and/or alternatively transmit, to the second data source, the payload including the first permission, the first set of data, and/or the second permission. In some embodiments, the payload is executed at the database where the second data source is stored. For example, an MDS layer at the database may execute the payload by applying the second permission to access the second set of data from the second data source.

In some embodiments, the MDS layer at the database may blend the first set of data accessed from the first data source and the second set of data accessed from the second data source. Alternatively, the OIS 110 may blend the first set of data accessed from the first data source and the second set of data accessed from the second data source. The MDS layer and/or the OIS 110 may transmit the blended data to the client.

In some implementations, the MDS layer and/or the OIS 110 generates a visualization based on the blended data. For example, at 1210, the MDS layer and/or the OIS 110 may cause, using the blended data, presentation of the visualization.

As noted above, the requested data may additionally and/or alternatively require one or more translations of the language of the data and/or the dimensions of the data. For example, the OIS 110 may determine that a first translation information is required to access the first set of data and/or the second translation information is required to access the second set of data. The OIS 110 may access the first set of data. In particular, the OIS 110 may inject, into the payload of the query, a first translation information retrieved from the first endpoint of the first LoB. For example, the OIS 110 may call the first endpoint of the first LoB to retrieve the first translation information. The OIS 110 may inject the first translation information to the structural part of the semantic model of the payload (e.g., such as by adding a clause in SQL). The OIS 110 may additionally and/or alternatively transmit, to the first data source, the payload including the first permission and/or the first translation information. In some embodiments, the payload is executed at the database where the first data source is stored. For example, an MDS layer at the database may execute the payload by applying the first permission and/or the first translation information to access the first set of data from the first data source.

In some embodiments, the OIS 110 may access the second set of data. In particular, the OIS 110 may inject, into the payload of the query, a second translation information retrieved from the second endpoint of the second LoB. For example, the OIS 110 may call the second endpoint of the second LoB to retrieve the second translation information. The OIS 110 may inject the second permission to the structural part of the semantic model of the payload (e.g., such as by adding a clause in SQL). The OIS 110 may additionally and/or alternatively transmit, to the second data source, the payload including the first permission, the first set of data, the second permission, the first translation information, and/or the second translation information. In some embodiments, the payload is executed at the database where the second data source is stored. For example, an MDS layer at the database may execute the payload by applying the second permission and/or the second translation information to access the second set of data from the second data source.

In some embodiments, the MDS layer at the database may blend the first set of data accessed from the first data source and the second set of data accessed from the second data source. Alternatively, the OIS 110 may blend the first set of data accessed from the first data source and the second set of data accessed from the second data source. The MDS layer and/or the OIS 110 may transmit the blended data to the client, where the visualization generated, based on the blended data, is presented.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving a query to generate, based on blended data, a visualization, the blended data comprising a first set of data from a first data source; and a second set of data from a second data source, the query further comprising a payload configured to be executed; accessing the first set of data, the accessing comprising: injecting, into the payload, a first permission retrieved from a first endpoint; and transmitting, to the first data source, the payload comprising the first permission; accessing the second set of data, the accessing comprising: injecting, into the payload, a second permission retrieved from a second endpoint; and transmitting, to the second data source, the payload comprising the first permission, the first set of data, and the second permission; and causing, at the user interface and using the blended data, presentation of the visualization.

Example 2: The system of example 1, wherein the operations further comprise: determining that the first permission is required to access the first set of data from the first data source and the second permission is required to access the second set of data from the second data source.

Example 3: The system of any one of examples 1 to 2, wherein the first data source is associated with a first line of business, the first line of business comprising the first endpoint; wherein the second data source is associated with a second line of business, the second line of business comprising the second endpoint; and wherein the first line of business is different from the second line of business.

Example 4: The system of example 3, wherein the accessing the first set of data further comprises calling the first endpoint of the first line of business to retrieve the first permission; and wherein the accessing the second set of data further comprises calling the second endpoint of the second line of business to retrieve the second permission.

Example 5: The system of any one of examples 1 to 4, wherein the operations further comprise blending the first set of data and the second set of data.

Example 6: The system of any one of examples 1 to 5, wherein, based on a determination that the first data source is a primary data source and the second data source is a secondary data source, the first set of data is accessed from the first data source prior accessing the second set of data from the second data source.

Example 7: The system of any one of examples 1 to 6, wherein the accessing the first set of data further comprises: injecting, into the payload, a first translation information retrieved from the first endpoint; wherein the payload transmitted to the first data source further comprises the first translation information; wherein the accessing the second set of data further comprises: injecting, into the payload, a second translation information retrieved from the second endpoint; and wherein the payload transmitted to the second data source further comprises the second translation information.

Example 8: A computer-implemented method, comprising: receiving a query to generate, based on blended data, a visualization, the blended data comprising a first set of data from a first data source; and a second set of data from a second data source, the query further comprising a payload configured to be executed; accessing the first set of data, the accessing comprising: injecting, into the payload, a first permission retrieved from a first endpoint; and transmitting, to the first data source, the payload comprising the first permission; accessing the second set of data, the accessing comprising: injecting, into the payload, a second permission retrieved from a second endpoint; and transmitting, to the second data source, the payload comprising the first permission, the first set of data, and the second permission; and causing, at the user interface and using the blended data, presentation of the visualization.

Example 9: The method of example 8, further comprising: determining that the first permission is required to access the first set of data from the first data source and the second permission is required to access the second set of data from the second data source.

Example 10: The method of any one of examples 8 to 9, wherein the first data source is associated with a first line of business, the first line of business comprising the first endpoint; wherein the second data source is associated with a second line of business, the second line of business comprising the second endpoint; and wherein the first line of business is different from the second line of business.

Example 11: The method of example 10, wherein the accessing the first set of data further comprises calling the first endpoint of the first line of business to retrieve the first permission; and wherein the accessing the second set of data further comprises calling the second endpoint of the second line of business to retrieve the second permission.

Example 12: The method of any one of examples 8 to 11, further comprising blending the first set of data and the second set of data.

Example 13: The method of any one of examples 8 to 12, wherein, based on a determination that the first data source is a primary data source and the second data source is a secondary data source, the first set of data is accessed from the first data source prior accessing the second set of data from the second data source.

Example 14: The method of any one of examples 8 to 13, wherein the accessing the first set of data further comprises: injecting, into the payload, a first translation information retrieved from the first endpoint; wherein the payload transmitted to the first data source further comprises the first translation information; wherein the accessing the second set of data further comprises: injecting, into the payload, a second translation information retrieved from the second endpoint; and wherein the payload transmitted to the second data source further comprises the second translation information.

Example 15: A non-transitory computer-readable medium storing instructions, which when executed by at least one data processor, result in operations comprising: receiving a query to generate, based on blended data, a visualization, the blended data comprising a first set of data from a first data source; and a second set of data from a second data source, the query further comprising a payload configured to be executed; accessing the first set of data, the accessing comprising: injecting, into the payload, a first permission retrieved from a first endpoint; and transmitting, to the first data source, the payload comprising the first permission; accessing the second set of data, the accessing comprising: injecting, into the payload, a second permission retrieved from a second endpoint; and transmitting, to the second data source, the payload comprising the first permission, the first set of data, and the second permission; and causing, at the user interface and using the blended data, presentation of the visualization.

Example 16: The non-transitory computer-readable medium of example 15, wherein the operations further comprise: determining that the first permission is required to access the first set of data from the first data source and the second permission is required to access the second set of data from the second data source.

Example 17: The non-transitory computer-readable medium of any one of examples 15 to 16, wherein the first data source is associated with a first line of business, the first line of business comprising the first endpoint; wherein the second data source is associated with a second line of business, the second line of business comprising the second endpoint; and wherein the first line of business is different from the second line of business.

Example 18: The non-transitory computer-readable medium of example 17, wherein the accessing the first set of data further comprises calling the first endpoint of the first line of business to retrieve the first permission; and wherein the accessing the second set of data further comprises calling the second endpoint of the second line of business to retrieve the second permission.

Example 19: The non-transitory computer-readable medium of any one of examples 15 to 17, wherein the operations further comprise blending the first set of data and the second set of data.

Example 20: The non-transitory computer-readable medium of any one of examples 15 to 17, wherein, based on a determination that the first data source is a primary data source and the second data source is a secondary data source, the first set of data is accessed from the first data source prior accessing the second set of data from the second data source.

Figure 13:
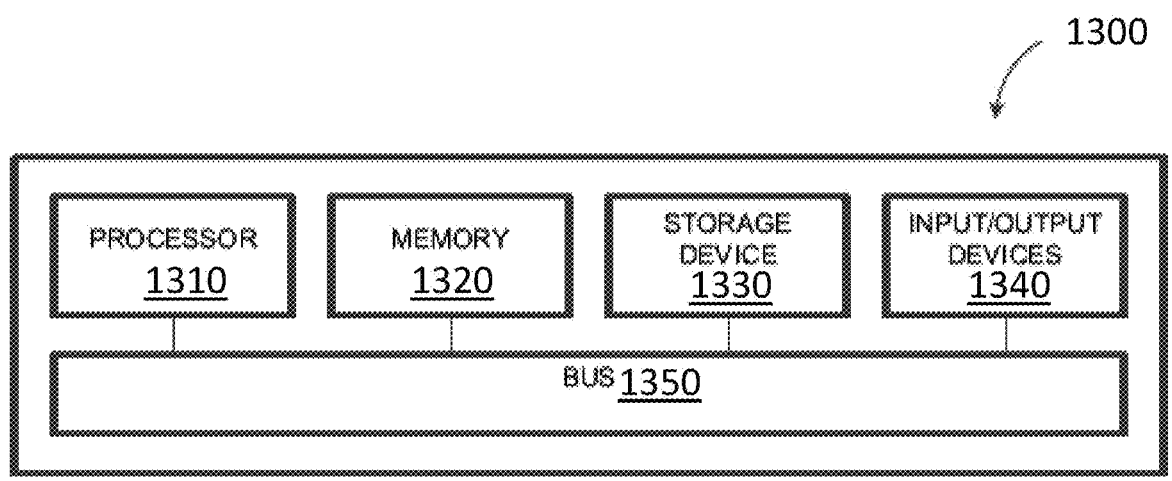
FIG. 13 depicts a block diagram illustrating a computing system, in accordance with some example embodiments.

FIG. 13 depicts a block diagram illustrating a computing system 1300 consistent with implementations of the current subject matter. Referring to FIGS. 1 and 13, the computing system 1300 can be used to implement the OIS 110, the client 120, the MDS layer, and/or any components therein.

As shown in FIG. 13, the computing system 1300 can include a processor 1310, a memory 1320, a storage device 1330, and indication/output devices 1340. The processor 1310, the memory 1320, the storage device 1330, and the indication/output devices 1340 can be interconnected via a system bus 1350. The processor 1310 is capable of processing instructions for execution within the computing system 1300. Such executed instructions can implement one or more components of, for example, the OIS 110, the client 120, and/or the MDS layer at the database 140. In some example embodiments, the processor 1310 can be a single-threaded processor. Alternately, the processor 1310 can be a multi-threaded processor. The processor 1310 is capable of processing instructions stored in the memory 1320 and/or on the storage device 1330 to display graphical information for a user interface provided via the indication/output device 1340.

The memory 1320 is a computer readable medium such as volatile or non-volatile that stores information within the computing system 1300. The memory 1320 can store data structures representing configuration object databases, for example. The storage device 1330 is capable of providing persistent storage for the computing system 1300. The storage device 1330 can be a floppy disk device, a hard disk device, an optical disk device, a tape device, a solid state device, and/or other suitable persistent storage means. The indication/output device 1340 provides indication/output operations for the computing system 1300. In some example embodiments, the indication/output device 1340 includes a keyboard and/or pointing device. In various implementations, the indication/output device 1340 includes a display unit for displaying graphical user interfaces.

According to some example embodiments, the indication/output device 1340 can provide indication/output operations for a network device. For example, the indication/output device 1340 can include Ethernet ports or other networking ports to communicate with one or more wired and/or wireless networks (e.g., a local area network (LAN), a wide area network (WAN), the Internet).

In some example embodiments, the computing system 1300 can be used to execute various interactive computer software applications that can be used for organization, analysis and/or storage of data in various formats. Alternatively, the computing system 1300 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the indication/output device 1340. The user interface can be generated and presented to a user by the computing system 1300 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one indication device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide indication to the computer. Other kinds of devices can be used to provide for interaction with a user as well. For example, feedback provided to the user can be any form of sensory feedback, such as for example visual feedback, auditory feedback, or tactile feedback; and indication from the user may be received in any form, including acoustic, speech, or tactile indication. Other possible indication devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
      receiving a query to generate, based on blended data, a visualization, the blended data comprising a first set of data from a first data source; and a second set of data from a second data source, the query further comprising a payload configured to be executed;
      accessing the first set of data, the accessing comprising:
         injecting, into the payload, a first permission retrieved from a first endpoint, wherein the first permission enables access to the first data source to retrieve the first set of data, and
         transmitting, to the first data source, the payload comprising the first permission;
      accessing the second set of data, the accessing comprising:
         injecting, into the payload, a second permission retrieved from a second endpoint, wherein the second permission enables access to the second data source to retrieve the second set of data, and
         transmitting, to the second data source, the payload comprising the first permission, the first set of data, and the second permission; and
      causing, at a user interface and using the blended data, presentation of the visualization.

2. The system of claim 1, wherein the operations further comprise: determining that the first permission is required to access the first set of data from the first data source and the second permission is required to access the second set of data from the second data source.

3. The system of claim 1, wherein the first data source is associated with a first product, the first product comprising the first endpoint; wherein the second data source is associated with a second product, the second product comprising the second endpoint; and wherein the first product is different from the second product.

4. The system of claim 3, wherein the accessing the first set of data further comprises calling the first endpoint of the first product to retrieve the first permission; and wherein the accessing the second set of data further comprises calling the second endpoint of the second product to retrieve the second permission.

5. The system of claim 1, wherein the operations further comprise blending the first set of data and the second set of data.

6. The system of claim 1, wherein, based on a determination that the first data source is a primary data source and the second data source is a secondary data source, the first set of data is accessed from the first data source prior accessing the second set of data from the second data source.

7. The system of claim 1, wherein the accessing the first set of data further comprises: injecting, into the payload, a first translation information retrieved from the first endpoint;
   wherein the payload transmitted to the first data source further comprises the first translation information;
   wherein the accessing the second set of data further comprises: injecting, into the payload, a second translation information retrieved from the second endpoint; and
   wherein the payload transmitted to the second data source further comprises the second translation information.

8. A computer-implemented method, comprising:
   receiving a query to generate, based on blended data, a visualization, the blended data comprising a first set of data from a first data source; and a second set of data from a second data source, the query further comprising a payload configured to be executed;
   accessing the first set of data, the accessing comprising:
      injecting, into the payload, a first permission retrieved from a first endpoint, wherein the first permission enables access to the first data source to retrieve the first set of data, and
      transmitting, to the first data source, the payload comprising the first permission;
   accessing the second set of data, the accessing comprising:
      injecting, into the payload, a second permission retrieved from a second endpoint, wherein the second permission enables access to the second data source to retrieve the second set of data, and
      transmitting, to the second data source, the payload comprising the first permission, the first set of data, and the second permission; and
   causing, at a user interface and using the blended data, presentation of the visualization.

9. The method of claim 8, further comprising: determining that the first permission is required to access the first set of data from the first data source and the second permission is required to access the second set of data from the second data source.

10. The method of claim 8, wherein the first data source is associated with a first product, the first product comprising the first endpoint; wherein the second data source is associated with a second product, the second product comprising the second endpoint; and wherein the first product is different from the second product.

11. The method of claim 10, wherein the accessing the first set of data further comprises calling the first endpoint to retrieve the first permission; and wherein the accessing the second set of data further comprises calling the second endpoint to retrieve the second permission.

12. The method of claim 8, further comprising blending the first set of data and the second set of data.

13. The method of claim 8, wherein, based on a determination that the first data source is a primary data source and the second data source is a secondary data source, the first set of data is accessed from the first data source prior accessing the second set of data from the second data source.

14. The method of claim 8, wherein the accessing the first set of data further comprises: injecting, into the payload, a first translation information retrieved from the first endpoint;
wherein the payload transmitted to the first data source further comprises the first translation information;
wherein the accessing the second set of data further comprises: injecting, into the payload, a second translation information retrieved from the second endpoint; and
wherein the payload transmitted to the second data source further comprises the second translation information.

15. A non-transitory computer-readable medium storing instructions, which when executed by at least one data processor, result in operations comprising:
receiving a query to generate, based on blended data, a visualization, the blended data comprising a first set of data from a first data source; and a second set of data from a second data source, the query further comprising a payload configured to be executed;
accessing the first set of data, the accessing comprising:
injecting, into the payload, a first permission retrieved from a first endpoint, wherein the first permission enables access to the first data source to retrieve the first set of data, and
transmitting, to the first data source, the payload comprising the first permission;
accessing the second set of data, the accessing comprising:
injecting, into the payload, a second permission retrieved from a second endpoint, wherein the second permission enables access to the second data source to retrieve the second set of data, and
transmitting, to the second data source, the payload comprising the first permission, the first set of data, and the second permission; and
causing, at a user interface and using the blended data, presentation of the visualization.

16. The non-transitory computer-readable medium of claim 15, wherein the operations further comprise: determining that the first permission is required to access the first set of data from the first data source and the second permission is required to access the second set of data from the second data source.

17. The non-transitory computer-readable medium of claim 15, wherein the first data source is associated with a first product, the first product comprising the first endpoint; wherein the second data source is associated with a second product, the second product comprising the second endpoint; and wherein the first product is different from the second product.

18. The non-transitory computer-readable medium of claim 17, wherein the accessing the first set of data further comprises calling the first endpoint of the first product to retrieve the first permission; and wherein the accessing the second set of data further comprises calling the second endpoint of the second product to retrieve the second permission.

19. The non-transitory computer-readable medium of claim 15, wherein the operations further comprise blending the first set of data and the second set of data.

20. The non-transitory computer-readable medium of claim 15, wherein, based on a determination that the first data source is a primary data source and the second data source is a secondary data source, the first set of data is accessed from the first data source prior accessing the second set of data from the second data source.

\* \* \* \* \*